(12) United States Patent
Cooper

(10) Patent No.: US 7,082,542 B2
(45) Date of Patent: Jul. 25, 2006

(54) POWER MANAGEMENT USING PROCESSOR THROTTLING EMULATION

(75) Inventor: Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 10/027,392

(22) Filed: Dec. 21, 2001

(65) Prior Publication Data

US 2003/0120960 A1 Jun. 26, 2003

(51) Int. Cl.
G06F 1/26 (2006.01)
G06F 1/32 (2006.01)
(52) U.S. Cl. ............... 713/320; 713/322; 713/323
(58) Field of Classification Search ............. 713/320
See application file for complete search history.

(56) References Cited

U.S. PATENT DOCUMENTS 5,983,357 A * 11/1999 Sun ......................... 713/324
6,016,548 A * 1/2000 Nakamura et al. ......... 713/323

* cited by examiner

*Primary Examiner*—Lynne H. Browne
*Assistant Examiner*—Stefan Stoynov
(74) *Attorney, Agent, or Firm*—Derek J. Reynolds

(57) ABSTRACT

In one embodiment of the invention, a processor state of a processor is determined upon expiration of a system management interrupt (SMI) timer. The processor state is one of an operational state and a low power state. The SMI timer is loaded with a timer value based on the processor state. The timer value is one of a first value and a second value. The processor is transitioned to one of the operational state and the low power state according to the processor state.

35 Claims, 5 Drawing Sheets

POWER MANAGEMENT USING PROCESSOR THROTTLING EMULATION

BACKGROUND

1. Field of the Invention

This invention relates to microprocessors. In particular, the invention relates to management.

2. Description of Related Art

Mobile platforms have historically been faced with power and thermal management challenges due to the small form factor, limited power source availability, and relatively high power processors. Techniques have been developed to reduce processor power dissipation.

One technique is to use throttling a stop clock (STPCLK#) signal to the processor. When STPCLK# signal is asserted to the processor, the processor enters a low power state such Mobile Quick Start or stop grant. When STPCLK# is de-asserted, the processor resumes execution. Throttling using STPCLK# involves modulating STPCLK# signal at a specific frequency and duty cycle, whereby effectively the processor operates at a reduced frequency. Throttling using STPCLK# has a number of drawbacks. First, it is complicated and requires complex external interface circuits and protocol. Second, it is not compatible with software standards in power management. Third, it is not efficient. Fourth, it is not flexible in generating an arbitrary duty cycle for the processor state.

Therefore, there is a need to have a technique for power management that can overcome the above drawbacks.

BRIEF DESCRIPTION OF THE DRAWINGS

The features and advantages of the present invention will become apparent from the following detailed description of the present invention in which.

DESCRIPTION OF THE INVENTION

Figure 1:
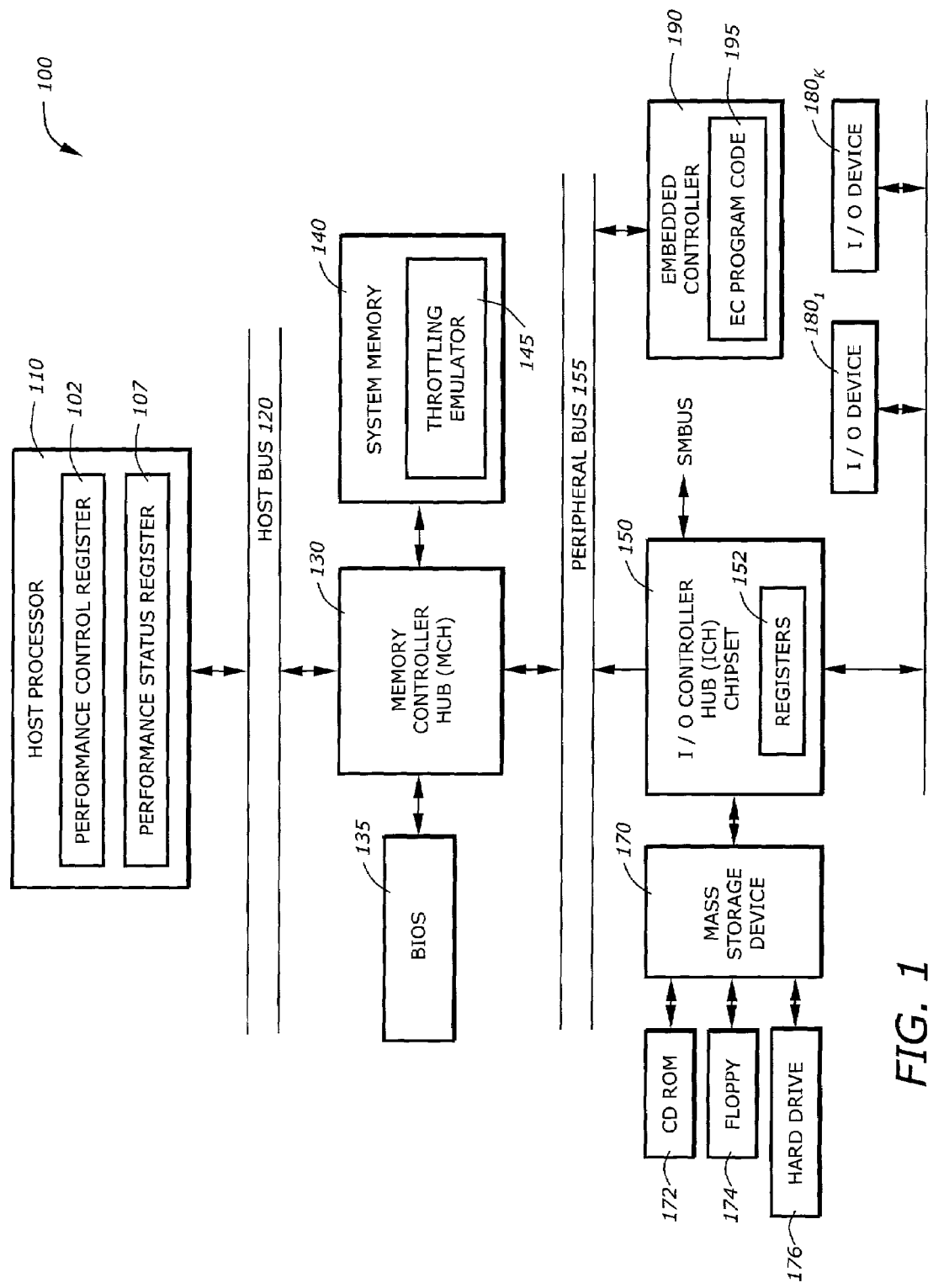
FIG. 1 is a diagram illustrating a system in which one embodiment of the invention can be practiced.

The present invention is a technique to emulate throttling a processor for power management. The technique includes (1) determining a processor state, which may be an operational state or a low power state, of a processor upon expiration of a system management interrupt (SMI) timer, (2) loading the SMI timer with a timer value based on the processor state, and (3) transitioning the processor to one of the operational state and the low power state according to the processor state. The timer value may be a first value and a second value which define the duty cycle of the processor state.

In the following description, for purposes of explanation, numerous details are set forth in order to provide a thorough understanding of the present invention. However, it will be apparent to one skilled in the art that these specific details are not required in order to practice the present invention. In other instances, well-known structures are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk (CD-ROM), an optical disk, a hard disk, a fiber optic medium, etc. The computer data signal may include any signal that can propogate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes a host processor 110, a host bus 120, a memory control hub (MCH) 130, a basic input and output system (BIOS) 135, a system memory 140, an input/output control hub (ICH) 150, a peripheral bus 155, a mass storage device 170, and input/output devices 180$_1$ to 180$_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In particular, the processor 110 includes a performance control (PERF_CTL) register 102 and a performance status register (PERF_STS) 105. The PERF_CTL register 102 allows an OS to control the processor performance by changing the bus ratio and operating voltage. The bus ratio is related to the operating frequency and the voltage is related to the power consumption. The PERF_STS register 107 stores the current bus ratio and the current voltage identifier which is used to control a voltage regulator to generate appropriate operating voltage.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the BIOS 135, system memory 140, and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The BIOS 135 stores boot-up or initialization code and data including look-up tables. The BIOS 135 is typically implemented with non-volatile memories such as flash memory, read only memory (ROM), erasable ROM, etc. The BIOS 135 or part of it may also be located internally to the MCH 130 or ICH 150.

The system memory 140 stores system code and data. The system memory 140 is typically implemented with dynamic random access memory (DRAM) or static random access memory (SRAM). The system memory may include program code or code segments implementing one embodiment of the invention. The system memory includes a throttling emulator 145 which may include separate elements. Any one of the elements of the thermal management module 145 may be implemented by hardware, software, firmware, microcode, or any combination thereof. The system memory 140 may also include other programs or data which are not shown, such as an operating system. The throttling emulator 145, when executed, causes the processor 110 to perform a number of tasks or operations as described later.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc. In one embodiment, the ICH 150 has support for ACPI operations including system management interrupt (SMI) and system control interrupt (SCI).

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The machine-readable media may contain computer readable program code to perform tasks as described in the following. These tasks may include determining a processor state of a processor upon expiration of a system management interrupt (SMI) timer, loading the SMI timer with a timer value based on the processor state, and transitioning the processor to an operational state or a low power state according to the processor state.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), and any other peripheral controllers.

The embedded controller (EC) 190 is any controller such as micro-controller, digital signal processor, or any programmable device that can execute its own programs. The embedded controller 190 contains EC program code 195. The EC program code contains instructions that cause the EC 190 to perform specified operations.

Figure 2:
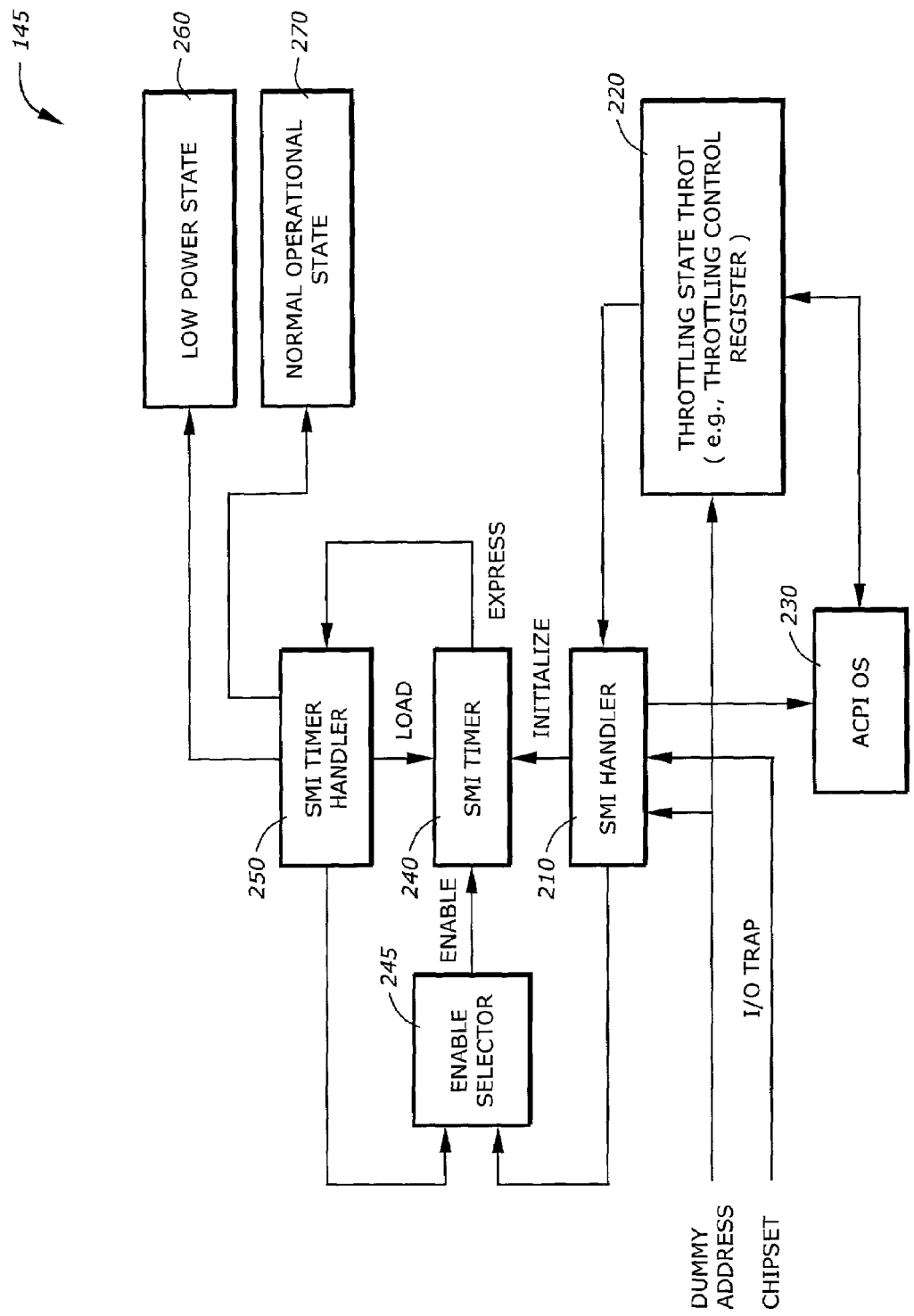
FIG. 2 is a diagram illustrating a throttling emulator according to one embodiment of the invention.

FIG. 2 is a diagram illustrating the throttling emulator 145 according to one embodiment of the invention. The throttling emulator 145 may include a number of elements that belong to separate modules. For clarity and illustrative purposes, the throttling emulator 145 is shown to be located in the system memory. Components of the throttling emulator 145 may be located in other places. In addition, any one of the components of the throttling emulator 145 may be implemented by software, firmware, hardware, or any combination thereof. The throttling emulator 145 includes a system management interrupt (SMI) handler 210, a throttling state 220, an Advanced Configuration and Power Interface (ACPI) Operating System (OS) 230, an SMI timer 240, a timer enable selector 245, an SMI timer handler 250, a low power state 260, and an operational state 270.

The SMI handler 210 interfaces with the ACPI OS 230 and the SMI timer 240. It is a function or routine that is invoked in response to an SMI or an input/output (I/O) trap generated by a chipset (e.g., the ICH 150 in FIG. 1). The ACPI OS 230 receives a dummy address to enable the SMI handler to trap on this dummy address. The dummy address is a false address with respect to the correct address of the throttling register or state 220. The purpose of providing a dummy address is to avoid the ACPI OS 230 from directly manipulating hardware registers that may not function properly or are not implemented or where the platform designers may wish to employ alternative behavior or functionality, etc. The SMI handler 210 also boots the ACPI OS 230 by loading the ACPI OS 230 into the system memory 140 (FIG. 1). The SMI handler 210 interfaces to the SMI timer 240 to enable/disable the SMI timer 240 to enable/disable the throttling emulation. If the throttling emulation is enabled, the SMI handler 210 initializes the SMI timer 240 by loading the initial value to the SMI timer 240.

The throttling state 220 THROT includes throttling control information such as the throttling registers used to emulate the processor throttling through the SMI handler SMI trap on the dummy address. The throttling state 220 is pointed to by the dummy address. In essence, the throttling state 220 implements a data structure similar to the description table (e.g., the FADT) and the associated registers which the ACPI OS 230 would have accessed in a normal power management scheme. This data structure may include throttling parameters such as the duty cycle of the processor state, and the processor state to be transitioned to. By re-directing the access to the throttling state 220 instead of the actual FADT, the technique provides direct control on the throttling function as if it were performed using the standard technique of using the STPCLK# signal.

The ACPI OS 230 is the OS that is compatible to the power management scheme as specified in the ACPI standard, published by Compaq Computer Corporation, Intel Corporation, Microsoft Corporation, Phoenix Technologies Ltd, and Toshiba Corporation, Revision 2.0, in Jul. 27, 2000. The ACPI OS 230, when booted by the SMI handler 210, obtains the dummy address and accesses the throttling state 220 to set the control parameters for power management. These control parameters may include the duty cycle of throttling, the power state, and the latency.

The SMI timer 240 generates periodic SMI timer event to the SMI timer handler 250 when it expires. Alternatively, the SMI timer 240 may generate SMI timing event to the SMI handler 210 which in turn invokes the SMI timer handler 250. The SMI timer 240 may be any suitable timing device such as the legacy timer in the chipset ICH 150 (FIG. 1). The SMI timer is enabled/disabled by the SMI handler 210 and the SMI timer handler 250 via the enable selector. The SMI timer event may be programmed to wake the processor from a low power state. Initially, the SMI timer 240 is enabled and initialized by the SMI handler 210. Once initialized, the SMI timer 240 runs independently and generates an SMI timer event upon expiration, i.e., when it reaches the terminal count. It can then be reloaded by new value to start another period until the next expiration. By alternately loading two timer values into the SMI timer 240, a variable duty cycle for the processor state can be achieved.

The SMI timer handler 250 is a function or routine to control the SMI timer 240 to transition the processor into one of the low power state 260 and the normal operational state 270 for periods corresponding to the timer values to be loaded into the SMI timer 240. The SMI timer handler 250 is invoked by the SMI handler 210 to service the SMI timer event provided by the SMI timer 240 at timer expiration.

The low power state 260 represents the power states that the processor is transitioned to. Examples of the low power state 260 include the power states C1, C2, C3, and the sleep state S1 as described in the ACPI standard version 2.0. To enter these power states, the SMI timer handler 250 may execute an instruction (e.g., the HLT instruction), or read a command register (e.g., the P_LVL2, P_LVL3) in accordance to the protocol set forth in the ACPI standard version 2.0.

The normal operational state 270 represents the operational state of the processor, such as the power state C0 as specified in the ACPI standard version 2.0. The operational state 270 is the state where the processor normally executes instructions. This state can be entered by generating an interrupt to the processor. The SMI timer event may be programmed to bring the processor to the normal operational state.

Figure 3:
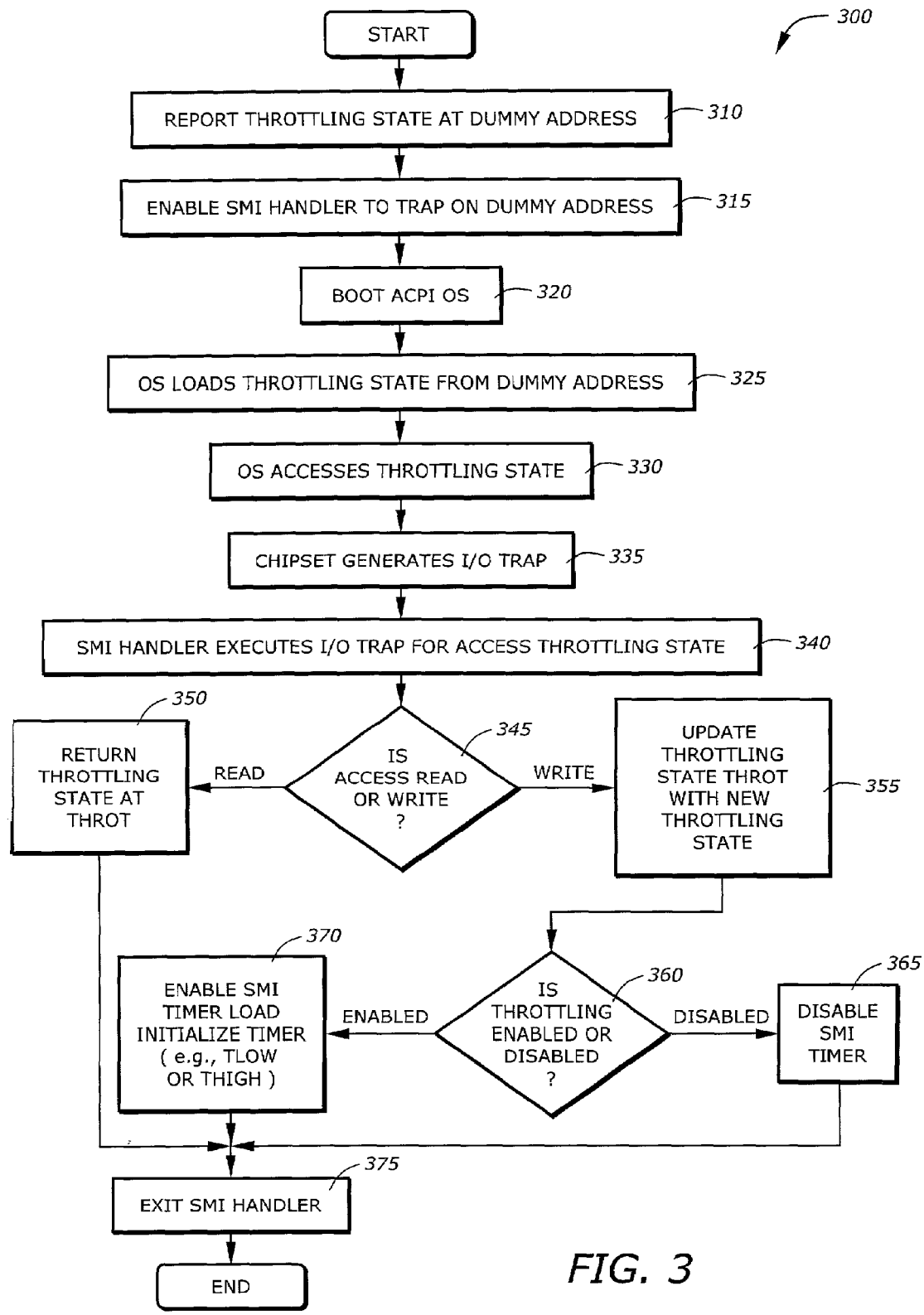
FIG. 3 is a flowchart illustrating a process to initialize timer-based power state change according to one embodiment of the invention.

FIG. 3 is a flowchart illustrating a process 300 to initialize timer-based power state change according to one embodiment of the invention.

Upon START, the process 300 reports a throttling state at the dummy or false address (Block 310). The dummy address corresponds to the location where the throttling state is stored. Next, the process 300 enables the SMI handler to trap on the dummy address (Block 315). Then, the SMI handler boots the ACPI OS (Block 320) and passes the dummy address to the ACPI OS.

Next, the ACPI OS obtains the dummy address and uses it to access the throttle state (Block 325). Then, the ACPI OS accesses the throttling state as if it were accessing the actual ACPI structures such as the FADT, the power registers, etc. (Block 330). Next, the chipset generates an I/O trap SMI to the SMI handler (Block 335). The SMI handler then executes the I/O trap for accessing the throttling state (Block 340).

Next, the SMI handler determines if the access to the throttling state is a read or a write access (Block 345). If it is a read access, the SMI handler returns the throttling state as the state variable THROT (Block 350) and goes to Block 375. If it is a write access, the SMI handler updates the throttling state with the new throttled state THROT (Block 355). Then, the SMI handler determines if the throttling is enabled or disabled (Block 360). If the throttling is disabled, the SMI handler disables the SMI timer, exits (Block 375) and is then terminated. If the throttling is enabled, the SMI handler enables the SMI timer and initializes the SMI timer by loading the initial timer value (Block 370). This initial timer value may be any value to allow the SMI timer to expire to generate the first SMI timer event. Then, the SMI handler exits (Block 375) and the process 300 is terminated.

Figure 4:
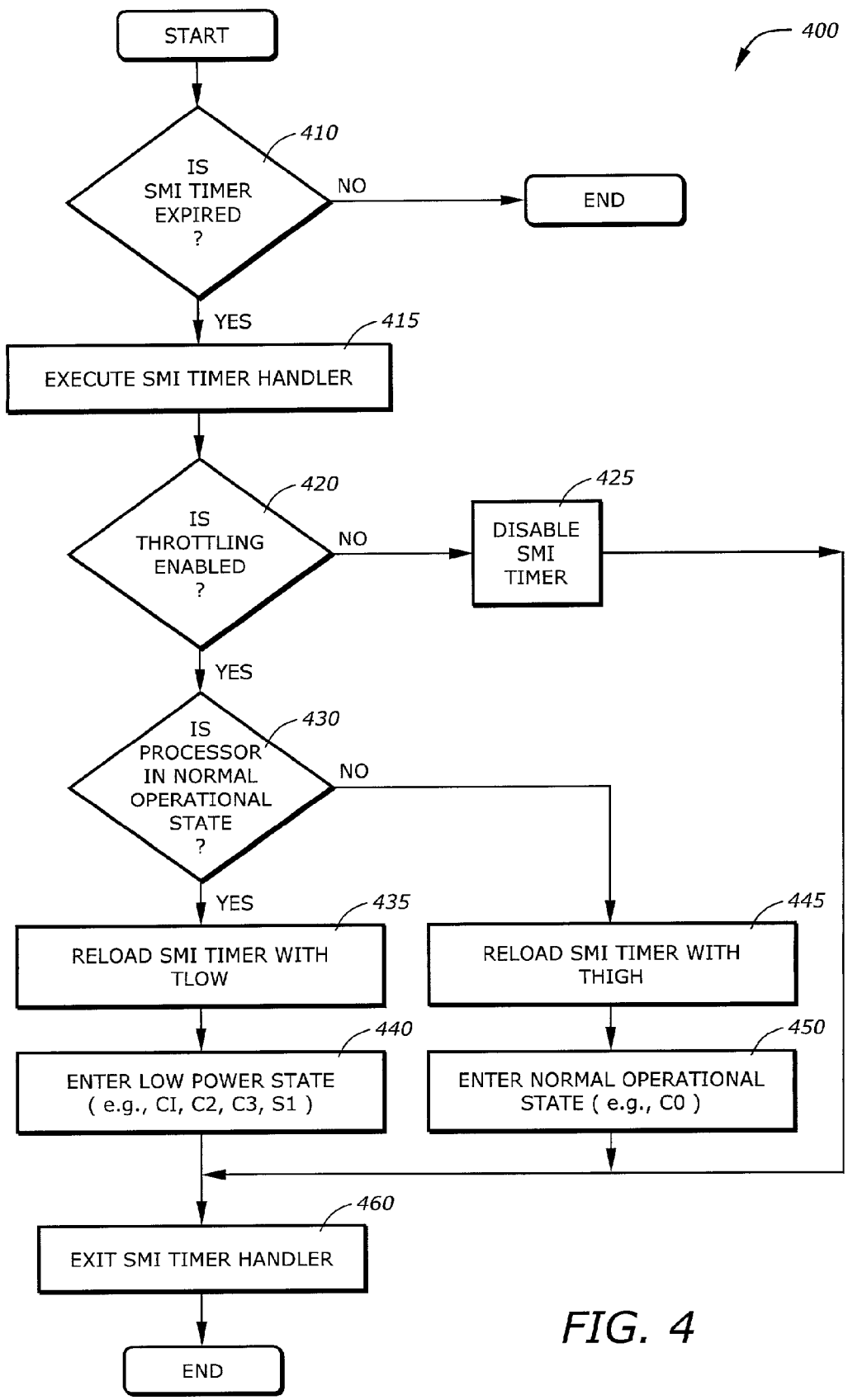
FIG. 4 is a flowchart illustrating a process to emulate throttling using timer according to one embodiment of the invention.

FIG. 4 is a flowchart illustrating a process 400 to emulate throttling using a timer according to one embodiment of the invention.

Upon START, the process 400 determines if the SMI timer expires (Block 410). Typically, the SMI timer expires by an asynchronous hardware mechanism and there is no need to poll the status of the SMI timer. If the SMI timer has not expired, the process 400 is terminated. If the SMI timer expires, an SMI timer event is generated and the SMI timer handler is invoked and executed (Block 415).

Next, the SMI timer handler determines if throttling is enabled (Block 420). If not, the SMI timer handler disables the SMI timer (Block 425), exits (Block 460) and is then terminated. If throttling is enabled, the SMI timer handler determines if the processor is in normal operational state or in low power state (Block 430). If the processor is in operational state, the SMI timer handler reloads the SMI timer with a value TLOW which corresponds to the time interval that the processor is in the low power state (Block 435). Then, the SMI timer handler performs operations to enter the desired low state (Block 440). As discussed above, the low state may be any one of a power state C1, C2, C3, and the sleep state S1. Next, the SMI timer handler exits (Block 460) and the process 300 is terminated. If the processor is not in the operational state, i.e., it is in the low power state, the SMI timer handler reloads the SMI timer with a value THIGH which corresponds to the time interval that the processor is in the operational state (Block 445). Then, the SMI timer handler performs operations to enter the normal operational state (e.g., the C0 state) (Block 450). This can be accomplished by generating an interrupt to the processor. Next, the SMI timer handler exits (Block 460) and the process 300 is terminated.

Figure 5:
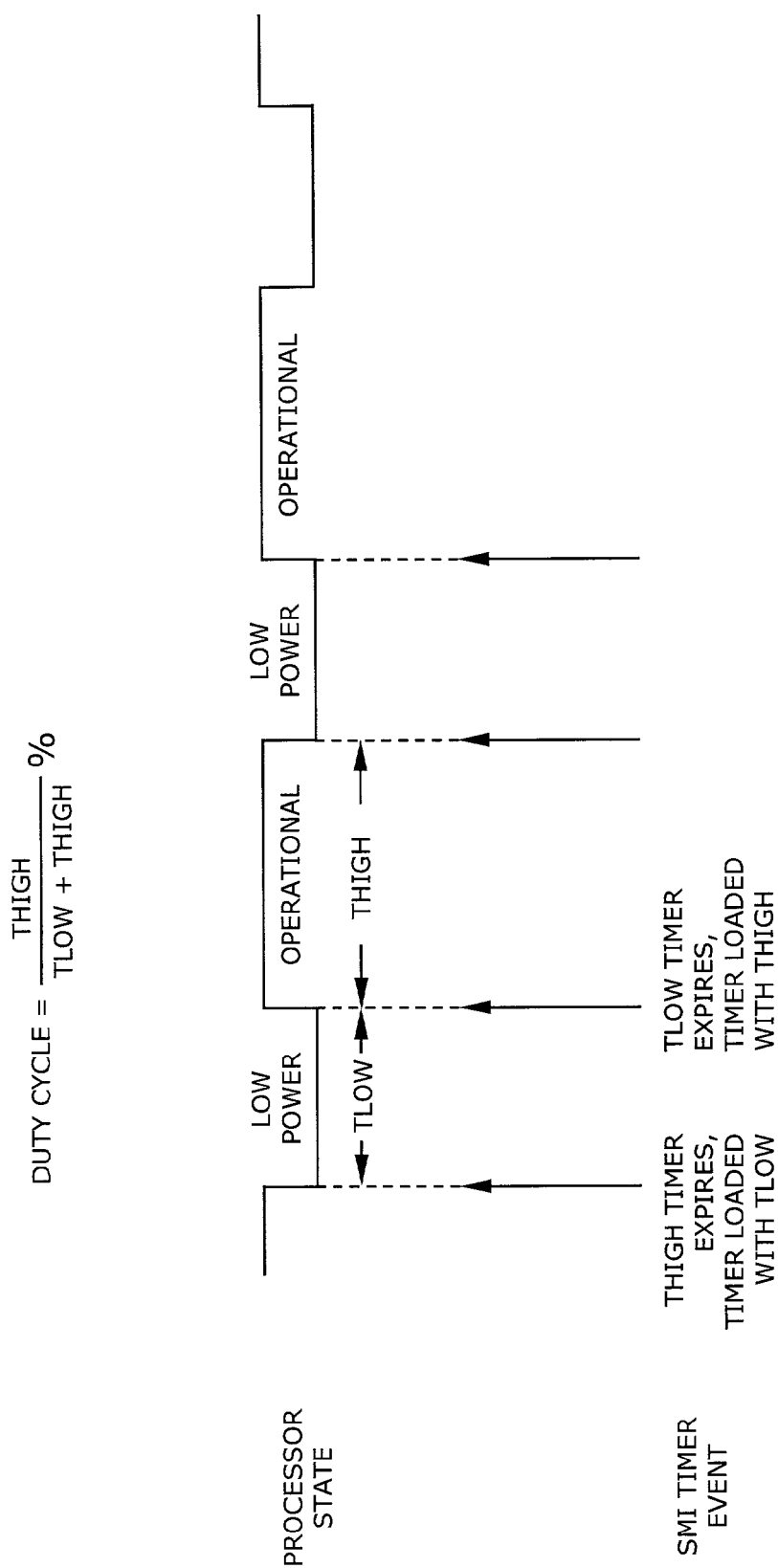
FIG. 5 is a diagram illustrating a duty cycle of the processor state according to one embodiment of the invention.

FIG. 5 is a diagram illustrating a duty cycle of the processor state according to one embodiment of the invention.

The processor state is either low power state or operational state. For illustrative purposes, the operational state is shown as a high value and the low power state is shown as a low value. The SMI timer event is generated when the SMI timer expires. Suppose initially the processor state is operational state. During this time, the timer has been loaded with the THIGH value. When the timer expires, it is reloaded with the TLOW value and the processor is transitioned to one of the low power states. The processor remains in the low power state for the time interval corresponding to TLOW. When the timer expires again, it is reloaded with the THIGH value and the processor is transitioned to the operational state. The processor remains in the operational state for the time interval corresponding to THIGH. Then, the timer expires and the process is repeated.

By selecting appropriate values of TLOW and THIGH, virtually any desired duty cycle can be achieved. This technique therefore provides more flexibility than the standard throttling technique where there is only a limited number of duty cycles (e.g., 8). The duty cycle is the ratio between the THIGH and the sum of TLOW and THIGH, expressed as a percentage. For example, when TLOW=THIGH, a 50% duty cycle results.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   if throttling is enabled,
      enabling a system management interrupt (SMI) timer;
      determining a processor state of a processor upon expiration of the SMI timer, the processor state being one of an operational state and a low power state;
      loading the SMI timer with a timer value based on the processor state,
      the timer value being one of a first value and a second value; and
      transitioning the processor to one of the operational state and the low power state according to the processor state.

2. The method of claim 1 wherein loading the SMI timer comprises:
   loading the SMI timer with the first value if the processor state is the operational state; and
   loading the SMI timer with the second value if the processor state is the low power state.

3. The method of claim 2 wherein transitioning comprises:
   transitioning the processor to the operational state if the processor state is the low power state; and
   transitioning the processor to the reduced power state if the processor state is the operational state.

4. The method of claim 3 wherein transitioning the processor to the low power state comprises:
   transitioning the processor to one of a first power state, a second power state, a third power state, and a sleep state.

5. The method of claim 1 further comprising disabling the SMI timer if throttling is disabled.

6. The method of claim 5 wherein booting the power management OS comprises:
   booting an Advanced Configuration and Power Interface (ACPI) OS.

7. The method of claim 1 further comprising:
   generating a SMI access to a throttling state in response to an input/output (I/O) trap;
   updating the throttling state if the access is a write; and
   returning the throttling state if the access is a read.

8. The method of claim 7 wherein generating the SMI access comprises:
   reporting the throttling state at a dummy address; and
   generating the I/O trap by an SMI handler using the dummy address, the I/O trap generating the SMI access.

9. The method of claim 8 wherein generating the I/O trap comprises:
   invoking the SMI handler to trap on the dummy address;
   booting a power management OS;
   loading the dummy address by the power management OS;
   accessing the throttling state at the dummy address by the power management OS; and
   generating the I/O trap by a chipset in response to accessing the throttling state by the power management OS.

10. The method of claim 1 wherein loading the SMI timer comprises:
    loading the SMI timer in a chipset.

11. A computer program product comprises:
    a processor readable storage medium having computer program code embedded therein, the computer program product having:
    if throttling is enabled,
       computer readable program code to enable a system management interrupt (SMI) timer;
       computer readable program code to determine a processor state of a processor upon expiration of the SMI timer, the processor state being one of an operational state and a low power state;
       computer readable program code to load the SMI timer with a timer value based on the processor state, the timer value being one of a first value and a second value; and
       computer readable program code to transition the processor to one of the operational state and the low power state according to the processor state.

12. The computer program product of claim 11 wherein the computer readable program code to load the SMI timer comprises:
    computer readable program code to load the SMI timer with the first value if the processor state is the operational state; and
    computer readable program code to load the SMI timer with the second value if the processor state is the low power state.

13. The computer program product of claim 12 wherein the computer readable program code to transition comprises:
    computer readable program code to transition the processor to the operational state if the processor state is the low power state; and
    computer readable program code to transition the processor to the reduced power state if the processor state is the operational state.

14. The computer program product of claim 13 wherein the computer readable program code to transition the processor to the low power state comprises:
    computer readable program code to transition the processor to one of a first power state, a second power state, a third power state, and a sleep state.

15. The computer program product of claim 11 further comprising computer readable program code to disable the SMI timer if throttling is disabled.

16. The computer program product of claim 15 wherein the computer readable program code to boot the power management OS comprises:
    computer readable program code to boot an Advanced Configuration and Power Interface (ACPI) OS.

17. The computer program product of claim 11 further comprising:
    computer readable program code to generate a SMI access to a throttling state in response to an input/output (I/O) trap;
    computer readable program code to update the throttling state if the access is a write; and
    computer readable program code to return the throttling state if the access is a read.

18. The computer program product of claim 17 wherein the computer readable program code to generate the SMI access comprises:
    computer readable program code to report the throttling state at a dummy address; and
    computer readable program code to generate the I/O trap by an SMI handler using the dummy address, the I/O trap generating the SMI access.

19. The computer program product of claim 18 wherein the computer readable program code to generate the I/O trap comprises:
    computer readable program code to invoke the SMI handler to trap on the dummy address;
    computer readable program code to boot a power management OS;
    computer readable program code to load the dummy address by the power management OS;
    computer readable program code to access the throttling state at the dummy address by the power management OS; and
    computer readable program code to generate the I/O trap by a chipset in response to accessing the throttling state by the power management OS.

20. The computer program product of claim 11 wherein the computer readable program code to load the SMI timer comprises:
    computer readable program code to load the SMI timer in a chipset.

21. A system comprising:
    a processor;
    a memory coupled to the processor to store a throttling emulator, the throttling emulator, when executed, causing the processor to:
        if throttling is enabled,
            enable a system management interrupt (SMI) timer;
            determine a processor state of the processor upon expiration of the SMI timer, the processor state being one of an operational state and a low power state;
            load the SMI timer with a timer value based on the processor state, the timer value being one of a first value and a second value; and
            transition the processor to one of the operational state and the low power state according to the processor state.

22. The system of claim 21 wherein the throttling emulator causing the processor to load causes the processor to:
    load the SMI timer with the first value if the processor state is the operational state; and
    load the SMI timer with the second value if the processor state is the low power state.

23. The system of claim 22 wherein the throttling emulator causing the processor to transition causes the processor to:
    transition the processor to the operational state if the processor state is the low power state; and
    transition the processor to the reduced power state if the processor state is the operational state.

24. The system of claim 23 wherein the throttling emulator causing the processor to transition the processor to the low power state causes the processor to:
    transition the processor to one of a first power state, a second power state, a third power state, and a sleep state.

25. The system of claim 21 wherein the throttling emulator, when executed, further causes the processor to disable the SMI timer if throttling is disabled.

26. The system of claim 25 wherein the throttling emulator causing the processor to boot the power management OS causes the processor to:
    boot an Advanced Configuration and Power Interface (ACPI) OS.

27. The system of claim 21 wherein the throttling emulator further causes the processor to:
    generate a SMI access to a throttling state in response to an input/output (I/O) trap;
    update the throttling state if the access is a write; and
    return the throttling state if the access is a read.

28. The system of claim 27 wherein the throttling emulator causing the processor to generate the SMI access causes the processor to:
    report the throttling state at a dummy address; and
    generate the I/O trap by an SMI handler using the dummy address, the I/O trap generating the SMI access.

29. The system of claim 28 wherein the throttling emulator causing the processor to generate the I/O trap causes the processor to:
    invoke the SMI handler to trap on the dummy address;
    boot a power management OS;
    load the dummy address by the power management OS;
    access the throttling state at the dummy address by the power management OS; and
    generate the I/O trap by a chipset in response to accessing the throttling state by the power management OS.

30. The system of claim 21 wherein the throttling emulator causing the processor to load the SMI timer causes the processor to:
    load the SMI timer in a chipset.

31. A method comprising:
    in response to receiving an interrupt, determining whether throttling is enabled; and
    if throttling is enabled,
        loading a periodic timer with a first timer value;
        transitioning from a first one of an operational state and a low power state to a second one of an operational state and a low power state;
        upon expiration of the periodic timer, loading the periodic timer with a second timer value; and
        transitioning from the second state to the first state.

32. The method of claim 31 further comprising:
    if throttling is disabled, disabling an event associated with the periodic timer.

33. The method of claim 31 wherein
    receiving an interrupt includes receiving a timer System Management Interrupt (SMI), and
    wherein loading the periodic timer includes loading a periodic SMI timer.

34. The method of claim 33 wherein transitioning from one of an operational state and a low power state includes transitioning from one of an operational state and one of multiple low power states.

35. The method of claim 31 further comprising:
    upon expiration of the periodic timer loaded with the second timer value, transitioning back to the first state.

* * * * *

UNITED STATES PATENT AND TRADEMARK OFFICE
CERTIFICATE OF CORRECTION

PATENT NO. : 7,082,542 B2
APPLICATION NO. : 10/027392
DATED : July 25, 2006
INVENTOR(S) : Cooper It is certified that error appears in the above-identified patent and that said Letters Patent is hereby corrected as shown below:

In Column 1, line 8, between "to" and "management", insert --power--.

Signed and Sealed this

Third Day of October, 2006

JON W. DUDAS
*Director of the United States Patent and Trademark Office*